United States Patent
Bernard et al.

(10) Patent No.: US 8,879,863 B1
(45) Date of Patent: Nov. 4, 2014

(54) METHOD FOR DETERMINING NOISE LEVEL

(71) Applicant: Qualcomm Technologies, Inc., San Diego, CA (US)

(72) Inventors: Christophe Bernard, London (GB); Sarah Lannes, Orsay (FR)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 13/888,802

(22) Filed: May 7, 2013

(51) Int. Cl.
*G06K 9/36* (2006.01)
*G06T 5/00* (2006.01)

(52) U.S. Cl.
CPC ..................... *G06T 5/00* (2013.01)
USPC ........... 382/240; 382/232; 382/224; 382/226; 382/260; 382/275

(58) Field of Classification Search
CPC ........... G06T 1/00; G06T 5/002; G06T 5/004; G06T 2200/00; G06T 2201/00; G06T 2207/20198; H04N 1/00; H04N 9/00
USPC ......... 382/181, 224, 226, 232, 240, 260, 275, 382/254, 294; 348/252, 242, 243, 222.1; 341/79
See application file for complete search history.

(56) References Cited

U.S. PATENT DOCUMENTS

| | | | | |
|---|---|---|---|---|
| 7,450,779 | B2 * | 11/2008 | Ferrari et al. | 382/275 |
| 2004/0146205 | A1 * | 7/2004 | Becker et al. | 382/232 |
| 2012/0147225 | A1 * | 6/2012 | Ishiga | 348/242 |

* cited by examiner

*Primary Examiner* — Ali Bayat
(74) *Attorney, Agent, or Firm* — Knobbe, Martens, Olson & Bear, LLP

(57) ABSTRACT

A method for determining noise levels in a subband of an image. The method comprises receiving the subband of the image, defining block regions in at least two space domains of the subband, for each defined block region, identifying first wavelet coefficients associated with coordinate values in the at least two space domains in the defined block region, computing a correlation matrix between identified wavelet coefficients to determine the correlation between first wavelet coefficients according to the at least one color domain, computing second wavelet coefficients, the computation of second wavelet coefficients being based on the correlation matrix and the first wavelet coefficients, computing at least one noise level, the noise level computation being based on at least one second wavelet coefficient and providing the at least one noise level.

10 Claims, 4 Drawing Sheets

METHOD FOR DETERMINING NOISE LEVEL

BACKGROUND OF THE INVENTION

The present invention relates to noise estimation domain in particular in the domain of image or video processing.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

A possible way to estimate the amount of noise is to use robust statistical method. For instance, (see Donoho, David L.; Iain M. Johnstone, December 1995, *"Adapting to Unknown Smoothness via Wavelet Shrinkage". Journal of the American Statistical Association* Vol. 90, No. 432: 1200-1244), a possible way to estimate a noise level of an image when the noise is white noise consists in computing the median of a high-pass subband.

The underlying expectation is that the median is carrying only information about the noise, and that the signal is sparse enough to have little impact on this median. Therefore, coefficients (in which the signal is relevant) represent less than few percent of the coefficient population).

In particular, the median of the absolute values of coefficients may be proportional to the noise standard deviation. This median may be scaled with an appropriate constant to yield an estimate of the standard deviation of the Gaussian noise.

$\sigma = \text{median}(|s|) \times f$ with $s$ the signal

The factor f (for instance f=1/0.67) may be estimated by measuring the median of values drawn from a known Gaussian generator of known standard deviation.

Such estimation has drawbacks as this expectation (i.e that the signal is sparsely represented in the high pass subband) is not always adequate.

Indeed, when the image is highly textured, or contains parts that are highly textured, the median may produce an estimate of the noise level that is much higher than what it ought to be: when a median is computed over a highly textured image, state of the art methods overestimate the amount of noise, apply a stronger than necessary noise reduction and wash out the textures that were confused with noise by the noise estimation algorithm.

There is thus a need for having a noise estimation method robust even if parts of the images are highly textured and then to improve image quality through a more robust noise level estimation leading to smoother noise reduction, and less aggressive flattening of textures in the highly textured images.

SUMMARY OF THE INVENTION

The invention relates to a method for determining noise levels in a subband of an image, the subband comprising at least one color domain and at least two space domains, said subband comprising first wavelet coefficients associated with coordinate value in the at least one color domain and the at least two space domains.

The method comprises:

receiving the subband of the image;

defining block regions in the at least two space domains of the subband;

for each defined block region:

identifying first wavelet coefficients associated with coordinate values in the at least two space domains in the defined block region;

computing a correlation matrix between identified wavelet coefficients to determine the correlation between first wavelet coefficients according to the at least one color domain;

computing second wavelet coefficients, the computation of second wavelet coefficients being based on the correlation matrix and the first wavelet coefficients;

computing at least one noise level, the noise level computation being based on at least one second wavelet coefficient;

providing the at least one noise level.

A subband is typically a set of coefficients $\{d_{c,j}^k(m,n)\}_{j,k}$ with j a scale index (e.g 1, 2, etc.) and k an orientation index (e.g. 1=vertical, 2=horizontal, 3=diagonal).

A typical image comprises a plurality of color channel such as a red channel, a blue channel and green channel (if the color model is RGB). It is possible to create a color domain c which comprises three values (e.g. c=1 for red, c=2 for green and c=3 for blue). In addition, a typical image is a 2D grid comprising points or pixels having two space domains (for instance, (x,y) or (m,n)), these two space domain being orthogonal.

As explained above, a subband may comprise wavelet coefficients $d_{c,j}^k(m,n)$ associated with coordinate value c in the color domain and with coordinate values m, n in the space domains.

"Defining block regions in the space domains" may be regrouping points of the space domains. For instance, the block regions may be regular rectangles or squares or any other geometrical forms or any arbitrary forms.

In addition, the image comprising two unidimensional space domains, A×B block regions may be defined in the two unidimensional space domains.

m and n may be coordinate values respectively in said two space domains with $0 \leq n < N$ and $0 \leq m < M$, N and M being integer values. A and B may be integers.

n and m may verify $a \cdot A \leq m < (a+1) \cdot A$, $b \cdot B \leq n < (b+1) \cdot B$ and $a = 0, 1/A \ldots (M-1)/A$ and $b = 0, 1/B \ldots (N-1)/B$.

In such situation, the two unidimensional space domains may define a two-dimensional space domain (m,n). The two-dimensional space domain may therefore be split into rectangles of size A×B and the coordinate values of a corner of the rectangle may be (aA, bB) with $a = 0, 1/A \ldots (M-1)/A$ and $b = 0, 1/B \ldots (N-1)/B$.

N and M may be respectively the height and the width of the image.

According to a possible embodiment, "identifying first wavelet coefficients" may comprise determining first wavelet coefficients associated with coordinate values verifying $a \cdot A \leq m < (a+1) \cdot A$ and $b \cdot B \leq n < (b+1) \cdot B$.

In addition, coordinates values of the at least one color domain may comprise $\{c_1, c_2, \ldots, c_f\}$. "Computing the correlation matrix" may comprise the computation of each element $\{Corr_{g,h}\}_{g,h}$ of the matrix, where g and h being in $\{1, \ldots f\}$. $Corr_{g,h}$ may be function of $$\frac{1}{S} \sum_{p \in S} d_{c_g}(p) d_{c_h}(p)$$

where S is a surface of the block region, p being a point of the block region having coordinate values in the at least two space domains, $d_{c_g}(p)$ being the first wavelet coefficient associated with coordinate values of point p and with coordinate value $c_g$ in the at least one color domain, $d_{c_h}(p)$ being the first wavelet coefficient associated with coordinate values of point p and with coordinate value $c_h$ in the at least one color domain.

Hence, the correlation matrix may be a f×f matrix and each element $Corr_{g,h}$ of the matrix may correspond to the correlation between the wavelet coefficients of the color channels $c_g$ and $c_h$ in the block region.

The notation $d_c(p)$ is a simplified notation for $d_{c,j}^k(p)$ with a given scale j and a given orientation k (i.e. for a given subband).

The point p may have coordinates value (m,n) in the space domains. Therefore, the $Corr_{g,h}$ may be noted $$\frac{1}{S} \sum_{(n,m) \in S} d_{c_g}(m, n) d_{c_h}(m, n).$$

If the block region is a rectangle of size A×B and if a corner of the rectangle have coordinates (aA,bB), then $Corr_{g,h}$ may be noted $$\frac{1}{AB} \sum_{\substack{a. \ A \le m < (a+1)A \\ b. \ B \le n < (b+1)B}} d_{c_1}(m, n) d_{c_2}(m, n).$$

According to one embodiment, "computing second wavelet coefficients" may comprise a principal component analysis transform.

Principal component analysis (or PCA) is a mathematical procedure that uses an orthogonal transformation to convert a set of observations of possibly correlated variables into a set of values of linearly uncorrelated (or mostly uncorrelated) variables called principal components. This transformation is often defined in such a way that the first principal component has the largest possible variance, and each succeeding component has the highest variance possible under the constraint that it be orthogonal to (i.e., uncorrelated with) the preceding components. Principal components are guaranteed to be independent only if the data set is jointly normally distributed. PCA may also be named the discrete Karhunen-Loève transform (KLT), the Hotelling transform or proper orthogonal decomposition (POD).

Moreover, "computing at least one noise level" may comprise the computation of at least a median.

Median is the numerical value separating the higher half of a sample, a population, or a probability distribution, from the lower half.

It is possible to compute a median for specific coefficients in the second wavelet coefficients.

A median $M_s$ for a block region S may be noted $M_S = \{|d_j^k[p]| : p \in S\}$ for a given scale j and a given orientation k (i.e. for a given subband), p being a point of the space domain.

In addition, "computing second wavelet coefficients" may transform the at least one color domain into at least one new color domain. One median may be computed. The latter median may be function of temporary medians, each temporary median of the temporary medians being associated with a coordinate value in the at least one new color domain of the subband, each temporary median being function of the coefficients associated with the coordinate value in the at least one new color domain of the subband associated with.

In such situation the above mentioned block region S corresponds to the entire space domains of the subband (i.e. of the image size).

If the color domain comprises a plurality of coordinate values (for instance, for the RGB color model), a temporary median may be computed for each coordinate value of the color domain.

Then, the latter median may be equal to the minimal temporary medians.

In a different embodiment, a plurality of medians may be computed. Each median may be associated with a defined block region. Each median may be function of temporary medians, each temporary median of the temporary medians being associated with a coordinate value in the at least one new color domain of the subband, each temporary median being function of the coefficients associated with the coordinate value in the at least one new color domain of the subband associated with.

In such situation the above mentioned block region S is one of the defined block regions.

If the color domain comprises a plurality of coordinate values (for instance, for the RGB color model), a temporary median may be computed for each coordinate value of the color domain. Then the median may be the minimal temporary median.

An estimate of the noise level may be the minimal median in the plurality of computed medians.

Another aspect of the invention relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Yet another aspect of the invention relates to a device for determining noise levels in a subband of an image. The subband comprises at least one color domain and at least two space domains. The subband comprises first wavelet coefficients associated with coordinate values in the at least one color domain and the at least two space domains.

The device comprises:
  an input interface for receiving the subband of the image;
  a circuit for defining block regions in the at least two space domains of the subband;
  a circuit for identifying first wavelet coefficients associated with coordinate values in the at least two space domains in the identified block;
  a circuit for computing a correlation matrix between identified wavelet coefficients to determine the correlation between first wavelet coefficients according to the at least one color domain;
  a circuit for computing second wavelet coefficients, the computation of second wavelet coefficients being based on the correlation matrix and the first wavelet coefficients;
  a circuit for computing at least one noise level, the noise level computation being based on at least one second wavelet coefficients;
  an output interface for providing the at least one noise level.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

An image l[m,n] (with n and m the coordinate values in the image, e.g. the pixel coordinate values) may be transformed into a set of wavelets decomposition subbands $d_j^k[m,n]$, where j is a scale index, and k is an orientation index.

For typical wavelet transforms used for images, (and in particular for those described in Stéphane Mallat, "*Une Exploration des Signaux en Ondelettes*", Editions de l'Ecole Polytechnique, ISBN: 2-7302-0733-3 for 2D images), the orientation index k is ranging from 1 to 3 (e.g. vertical, horizontal and diagonal). Each subband has a varying size depending on a scale index j that ranges from 1 to some maximum value D (integer).

$$d_j^k[m,n] \text{ for } j=1 \ldots D, \text{ and } k=1 \ldots 3.$$

A standard approach may consist in considering the specific subband $d_1^k[m,n]$ for k=1, 2 or 3 (i.e. the subband corresponding to the first scale, j=1), and to compute the median of the absolute values of this population of coefficients. If the majority of the surface of the image is covered with high activity texture, resulting in many high-frequency coefficients, the presence of the texture will bias the noise level estimation, leading to an overestimation of the noise level.

In order to avoid this drawback, it is possible to split the subband $d_1^k[m,n]$ (for k=1, 2 or 3) into blocks of coefficients according to the following method.

Figure 1A:
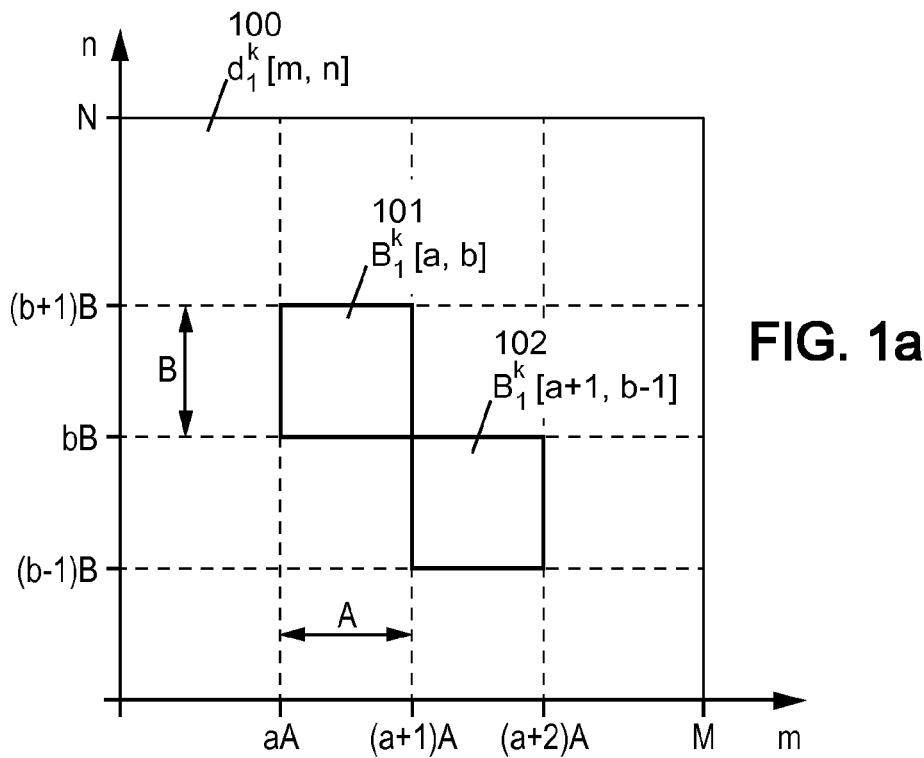
FIG. 1a and FIG. 1b are representations of possible splitting of a subband into a plurality of block regions.

In reference to FIG. 1a, and assuming that the considered subband $d_1^k[m,n]$ (element 100) comprises M×N coefficients $d_1^k(m,n)$ with n=1 ... N and m=1 ... M, then the subband $d_1^k[m,n]$ (element 100) is split into several blocks $\{B_1^k{}_{[a,b]}\}_{a,b}$ (elements 101, 102) of size A×B (with a=0,1/A ... (M−1)/A and b=0,1/B ... (N−1)/B).

Block $B_1^k{}_{[a,b]}$ (element 101) contains the coefficients $d_j^k(m,n)$ for $$a \cdot A \leq m < (a+1) \cdot A, \text{ and}$$

$$b \cdot B \leq n < (b+1) \cdot B.$$

Then a median value $M_{a,b}$ is defined for each block in $\{B_1^k{}_{[a,b]}\}_{a,b}$ as the median of the set of values $\{|d_j^k[m,n]| : a \cdot A \leq m < (a+1) \cdot A \text{ and } b \cdot B \leq n < (b+1) \cdot B\}$:

$$M_{a,b} = \text{median}(\{|d_j^k[m,n]| : a \cdot A \leq m < (a+1) \cdot A \text{ and } b \cdot B \leq n < (b+1) \cdot B\})$$

Therefore if at least one block does not contain texture, it may provide a reliable estimate of the noise level. All other blocks may provide an over-estimated noise level.

A reasonable estimate of the noise level is then the minimum of these blockwise estimates: $\sigma = \min_{a,b}(M_{a,b} \cdot C)$ where the coefficient C may be calibrated by doing the same estimation on a known Gaussian source of the same size and the same number of blocks.

In this embodiment the intersection between two blocks is empty. Nevertheless, it may also be possible to partially superpose blocks for instance as described in FIG. 1b. In this latter embodiment, the blocks (elements 103, 104) contain the same number of coefficients i.e. the blocks size are A×B. Block $B_1^k{}_{[a,b]}$ (element 101) contains the coefficients $d_j^k(m,n)$ for

- a. $\frac{A}{3} \leq m < (a+3) \cdot \frac{A}{3}$, and

- b. $\frac{B}{3} \leq n < (b+3) \cdot \frac{B}{3}$.

All other adaptations with other sub-sampling factors is possible (here the sub-sampling factor is 3)

In most case, a texture in a given image l[m,n] contains high frequency contents. This content may be located on a single color channel, or on a low-dimensional manifold of the color space. For example, as a grass texture is mostly green, the texture mostly contains high spatial frequencies on a sub manifold of the color space that contains shades of green.

Real noise on the other hand is often distributed on all three color channels (if the color model is not RGB for "Red Green Blue"), so the noise is colored and is spanning a real three-dimensional subset of the color cube. If the color model is not RGB (for instance YCbCr or CMYK or any other color models) the considerations are similar.

Figure 2A:
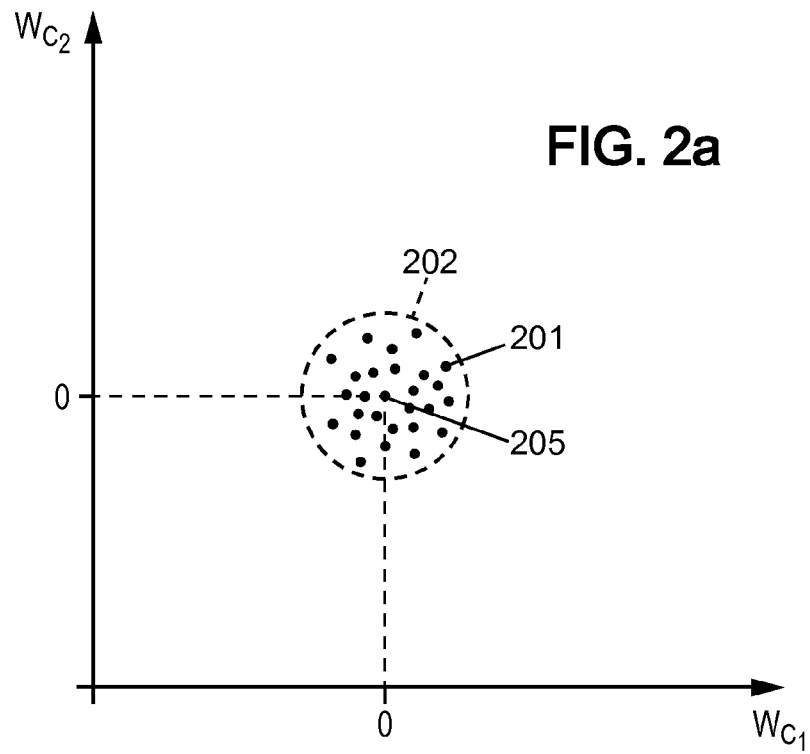
FIGS. 2a and 2b represent the correlation of noise levels between two color coordinates, respectively in case of a pure noise and in case of a noisy texture.

FIG. 2a represents wavelet coefficients of a given subband of a noised color image with two color channels/coordinates (for simplification purpose only). This Figure may be generalized with a greater number of color coordinates. The wavelets coefficients are associated with the two color coordinates $W_{C1}$ and $W_{C2}$ representing the two colors C1 and C2.

This image contains noise without any texture. Therefore, the dots 201 represent the population of wavelet coefficients of the channels with noise. The population is in a centered circle 202 without any privileged direction.

In such situation, where the distribution of population is symmetric according to a point 205, the wavelet components $W_{C1}$ and $W_{C2}$ (representing the channels of the image) are uncorrelated.

Figure 2B:
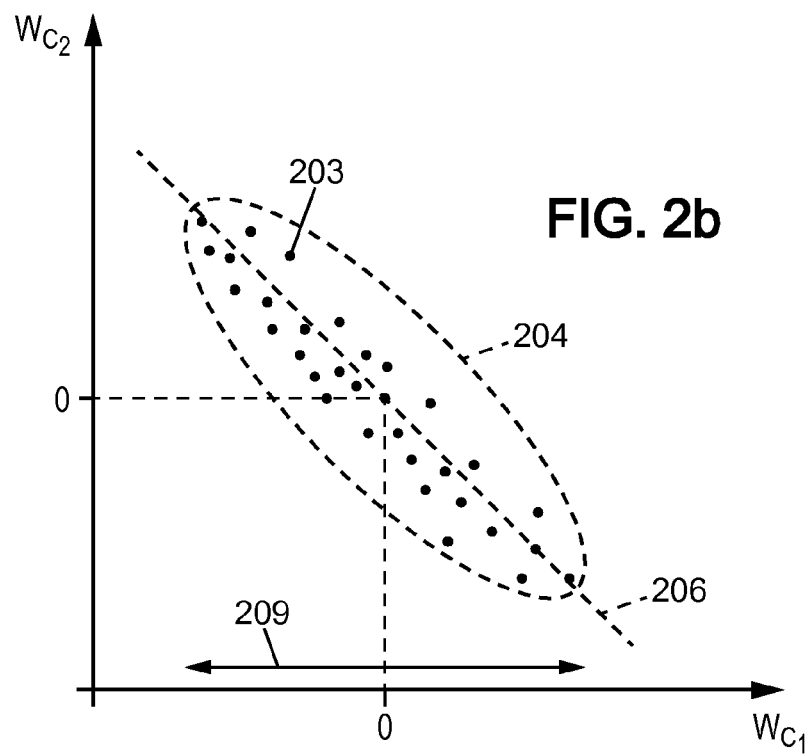

FIG. 2b represents wavelet coefficients of a given subband of a noised color image with two color channels, the image having a textured content. The wavelets coefficients are associated with the two color coordinates $W_{C1}$ and $W_{C2}$ representing the two colors C1 and C2.

Therefore, the dots 203 represent the population of wavelet coefficients of subband according to the color coordinates. The population may be grouped in an ovoid 204. The ovoid 204 has a privileged direction 206.

Since the noise-free texture is assumed to be lying on a small dimensional manifold, the form 204 is flat and elongated along a principal direction 206.

In the situation represented in FIG. 2b, the population of coefficients is correlated as the distribution along each axis $W_{C1}$ and $W_{C2}$ is not uniform.

Figure 2C:
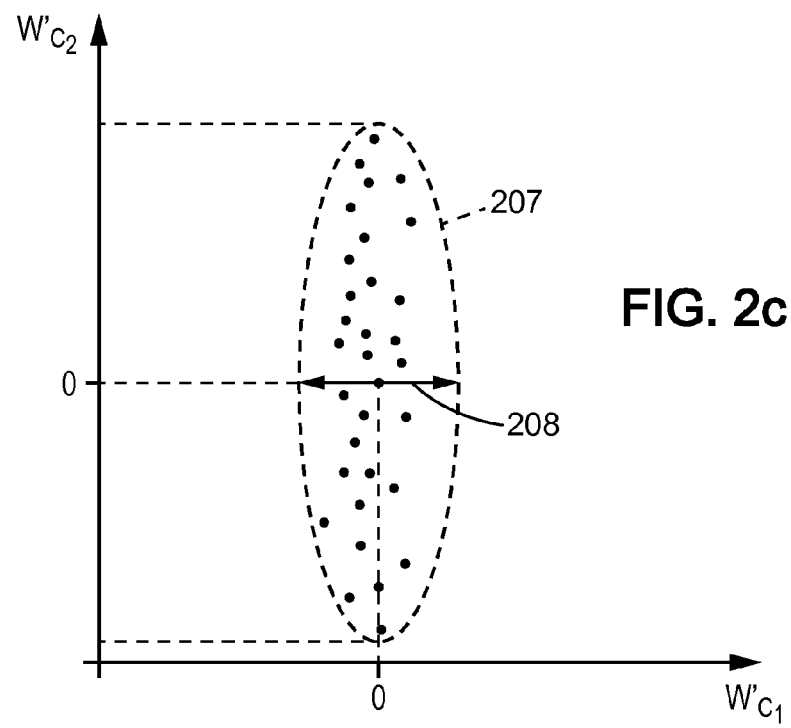
FIG. 2c is a representation of a method to compute uncorrelated color components in case of a noisy texture.

Nevertheless, it is possible to "rotate" the color axis to obtain two new uncorrelated color components $W'_{C1}$ and $W'_{C2}$ as described in FIG. 2c. Therefore, the rotated ovoid 207 is similar to the ovoid 204 of FIG. 2b (disregarding the rotation).

To compute uncorrelated components, it is possible to use a Principal component analysis (PCA) mathematical procedure to convert the correlated population of coefficients into a set of values of linearly uncorrelated variables.

Once the color components have been "rotated", it is possible to easily compute a noise level for the subband coefficients.

In FIG. 2c, the median of coefficients along the axis $W'_{C1}$ is smaller than the median of coefficients along the axis $W'_{C2}$. In consequence, in case of colored texture, $W'_{C1}$ mostly carries noise.

The objective of this transformation is to capture a value which is proportional to a noise level, the captured value being the width of ovoid (arrow 208 in FIG. 2c) and not width of the projection of the ovoid onto a random axis (arrow 209 in FIG. 2b), which would be much larger.

Figure 3:
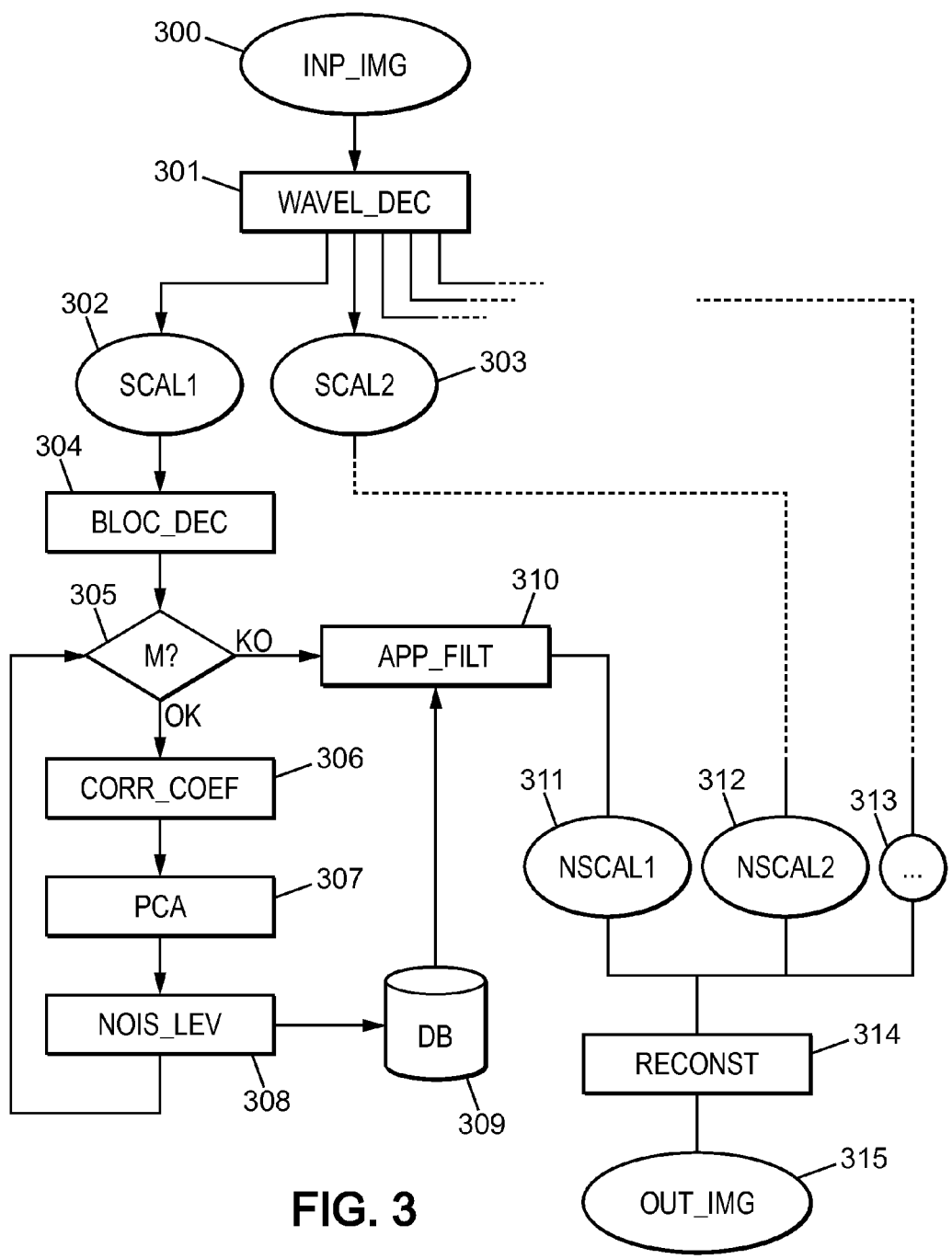
FIG. 3 is a flow chart describing a possible embodiment of the present invention.

FIG. 3 is a flow chart describing a possible embodiment of the present invention. Part of this flow chart may represent steps of an example of a computer program which may be executed by the device of FIG. 4.

Upon the reception of an input image 300, this input image 300 may be decomposed into a plurality of subbands (step 301). Each subband may be associated with a given scale/resolution j (in reference to a multiresolution wavelet transform), a color c, and an orientation k (for instance, three possible orientations).

Using the notation of multiresolution analysis, it is possible to "project" the images values of the image onto a span of functions to obtain a plurality of resolution approximations (i.e. scales, elements 302, 303).

Each scale (302, 303, etc) may comprise a plurality of subband (characterized for instance by an orientation k).

Figure 1B:
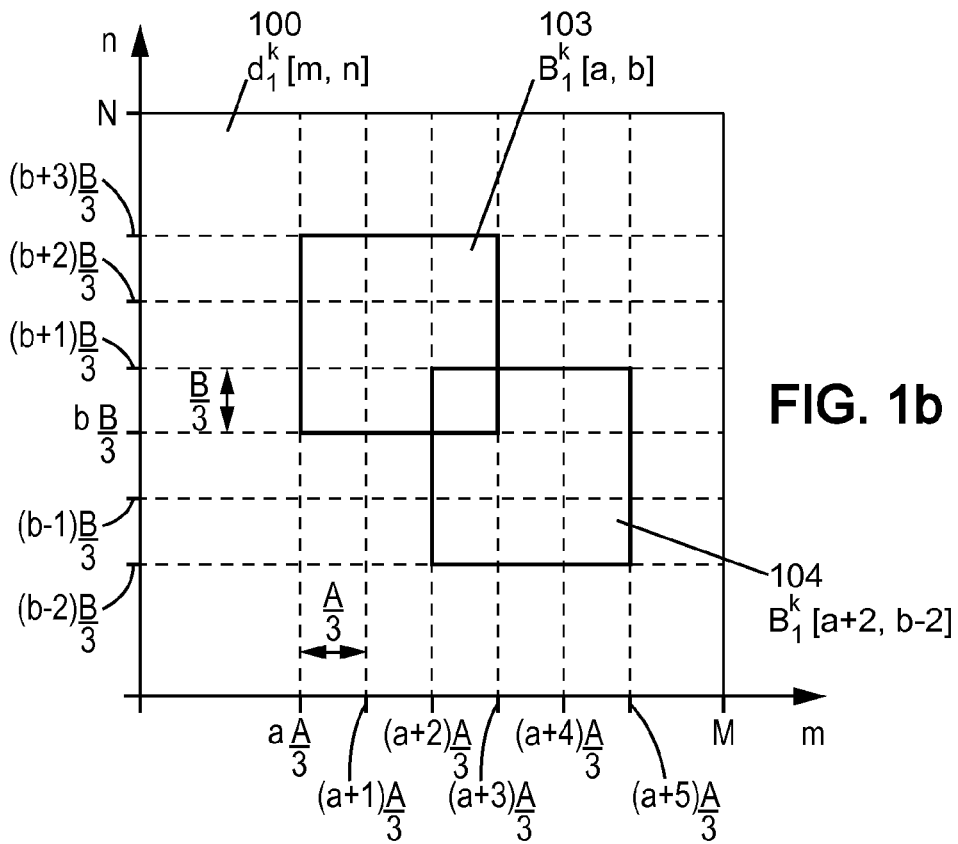

Each subband (defined by k and j) may be decomposed (step 304) into a plurality of blocks $\{B_j^k{}_{[a,b]}\}_{a,b}$ as described in FIG. 1b or FIG. 1b. The following description uses the notations introduced in the description in relation with these Figures.

For each block $B_j^k{}_{[a,b]}$ of the subband (j,k), a noise level is to be computed. Therefore, if the noise level of one block in $\{B_j^k{}_{[a,b]}\}_{a,b}$ has not been computed (test 305, output OK), the following steps 306, 307, 308 are executed.

At first, indexes m,n are determined so that:

$a \cdot A \leq m < (a+1) \cdot A$, and $b \cdot B \leq n < (b+1) \cdot B$.

The wavelet coefficients $d_{c,j}^k(m,n)$ on such a range of indexes m,n are also determined for all color components of the image and of the subband (the image being encoded according a model in RGB, YCbCr, etc. model), where the index 'c' is denoting the color index for the color domain (e.g. c=1 for red, c=2 for green and c=3 for blue in RGB or similarly for a YCbCr color space).

For simplification purpose, it is assumed that the color model used to code the image is RGB and thus that there are three color components.

The wavelet coefficients being of zero mean, a correlation matrix of coefficients between colors may be computed (step 306). For instance, the correlation matrix of $d_{c1,j}^k(m,n)$ and $d_{c2,j}^k(m,n)$ is $\mathrm{Corr}_{a,b}(c_1, c_2) =$ $$\frac{1}{AB} \sum_{\substack{a \cdot A \leq m < (a+1) \cdot A \\ b \cdot B \leq n < (b+1) \cdot B}} d_{c_1,j}^k(m,n) d_{c_2,j}^k(m,n).$$

A "Principal component analysis" (or PCA) may be computed (step 307) with theses correlations matrixes $\{\mathrm{Corr}_{a,b}(c_1,c_2): c_1=1 \ldots 3$ and $c_2=1 \ldots 3\}$. The correlation matrix $\mathrm{Corr}_{a,b}$ may be noted $\mathrm{Corr}_{a,b} = U D U^T$ where U is an orthogonal matrix and D is a diagonal matrix with decreasing diagonal coefficients. The matrix U is a matrix of eigenvectors which diagonalizes the matrix $\mathrm{Corr}_{a,b}$. D is the diagonal matrix of eigenvalues of $\mathrm{Corr}_{a,b}$. This step will typically involve the use of a computer-based algorithm for computing eigenvectors and eigenvalues. These algorithms are readily available as sub-components of most matrix algebra systems.

Once the matrix U is determined, applying $U^T$ to the vector of wavelet color components generates new uncorrelated coefficients:

$$\begin{bmatrix} C_{jk1}(m,n) \\ C_{jk2}(m,n) \\ C_{jk3}(m,n) \end{bmatrix} = U^T \times \begin{bmatrix} d_{1,j}^k(m,n) \\ d_{2,j}^k(m,n) \\ d_{3,j}^k(m,n) \end{bmatrix}$$

This application of $U^T$ to the vector of components may be done block by block (i.e. for n and m that verify $a \cdot A \leq m < (a+1) \cdot A$, and $b \cdot B \leq n < (b+1) \cdot B$), so that the PCA (for "Principal component analysis") may be adapted locally on the texture properties.

Then, the noise level may be estimated (step 308) from the median of the whole subband $C_{jkc}(m,n)$ or blockwise from this subband as described above.

Alternatively, it can be computed by doing a blockwise median estimation on blocks of $C_{jk1}[m,n]$,
blocks of $C_{jk2}[m,n]$,
blocks of $C_{jk3}[m,n]$, and by computing the minimum of all blockwise medians obtained with all the above blockwise median estimations.

The noise level estimation for each subband may be stored in a database 309 or in a memory for future use.

Once the noise level of all blocks in $\{B_j^k{}_{[a,b]}\}_{a,b}$ has been computed (test 305, output KO), a filter may be applied (step 310) for instance on the subband or on the image. Many noise reduction filters may be used such as NL-means, linear smoothing filters, anisotropic diffusion filters, etc. according to the noise level stored in the database 309.

When all new scales (311, 312, 313) are available, a new image 315 may be constructed (step 314) according to these new scales with an inverse wavelet transformation.

Figure 4:
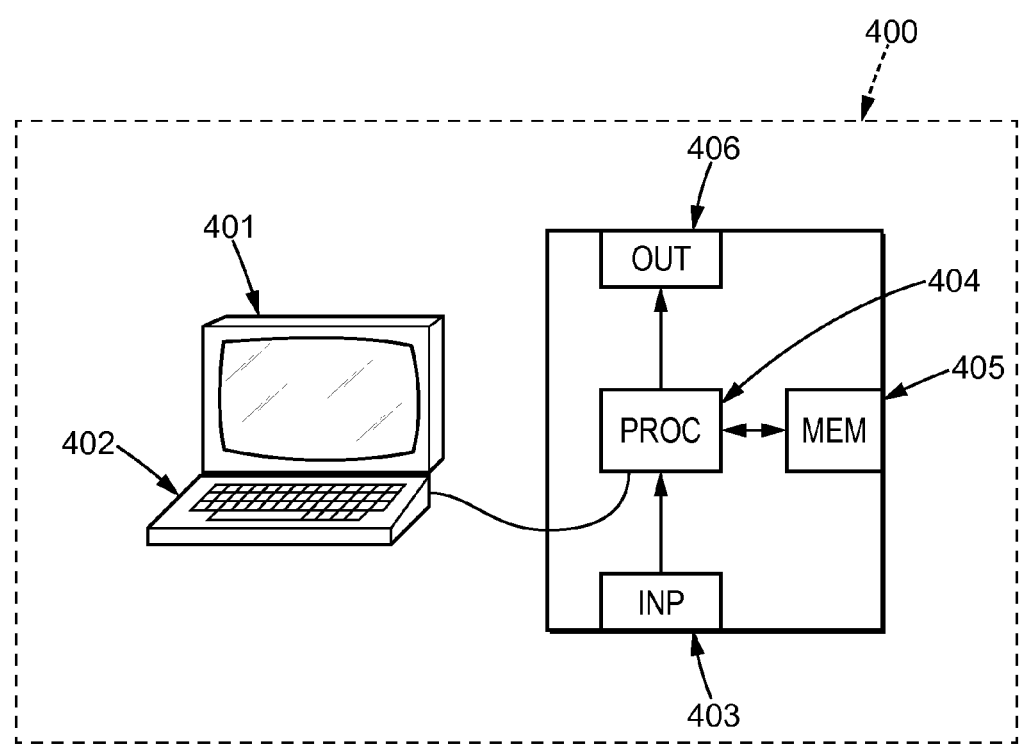
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 403 for the reception of subbands and an output interface 406 for providing a noise level.

To ease the interaction with the computer, a screen 401 and a keyboard 402 may be provided and connected to the computer circuit 404.

A person skilled in the art will readily appreciate that various parameters disclosed in the description may be modified and that various embodiments disclosed may be combined without departing from the scope of the invention.

What is claimed is:

1. A method for determining noise levels in a subband of an image,
   the subband comprising at least one color domain and at least two space domains,
   the subband comprising first wavelet coefficients associated with coordinate value in the at least one color domain and with coordinate values in the at least two space domains, wherein the method comprises:
   receiving the subband of the image;
   defining block regions in the at least two space domains of the subband;
   for each defined block region:
      identifying first wavelet coefficients associated with coordinate values in the at least two space domains in the defined block region;
      computing a correlation matrix between identified wavelet coefficients to determine the correlation between first wavelet coefficients according to the at least one color domain;
      computing second wavelet coefficients, the computation of second wavelet coefficients being based on the correlation matrix and the first wavelet coefficients;
   computing at least one noise level, the noise level computation being based on at least one second wavelet coefficient; and
   providing the at least one noise level.

2. A method according to claim 1, wherein, the image comprising two unidimensional space domains, A×B block regions are defined in the two unidimensional space domains, n and m being coordinate values respectively in said two space domains with 0≤n<N and 0≤m<M, N and M being integer values, A and B being integers, n and m verifying a·A≤m<(a+1)·A, b·B≤n<(b+1)·B and a=0,1/A ... (M−1)/A and b=0,1/B ... (N−1)/B.

3. A method according to claim 2, wherein identifying first wavelet coefficients comprises:
   determining first wavelet coefficients associated with coordinates values verifying a·A≤m<(a+1)·A and b·B≤n<(b+1)·B.

4. A method according to claim 1, coordinates values of the at least one color domain comprises $\{c_1, c_2, \ldots, c_f\}$, wherein computing the correlation matrix comprises the computation of each elements $\{\text{Corr}_{g,h}\}_{g,h}$ of the matrix, where g and h being in $\{1, \ldots f\}$, and wherein $\text{Corr}_{g,h}$ is function of $$\frac{1}{S}\sum_{p \in S} d_{c_g}(p) d_{c_h}(p)$$

where S is a surface of the block region, p being a point of the block region having coordinate values in the at least two space domains, $d_{c_g}(p)$ being the first wavelet coefficient associated with coordinate values of point p and with coordinate value $c_g$ in the at least one color domain, $d_{c_h}(p)$ being the first wavelet coefficient associated with coordinate values of point p and with coordinate value $c_h$ in the at least one color domain.

5. A method according to claim 1, wherein computing second wavelet coefficients comprises a principal component analysis transform.

6. A method according to claim 1, wherein computing at least one noise level comprises the computation of at least a median.

7. A method according to claim 6, wherein, computing second wavelet coefficients transforming the at least one color domain into at least one new color domain, one median is computed, said latter median being function of temporary medians, each temporary median of the temporary medians being associated with a coordinate value in the at least one new color domain of the subband, each temporary median being function of the coefficients associated with the coordinate value in the at least one new color domain of the subband associated with.

8. A method according to claim 6, wherein, computing second wavelet coefficients transforming the at least one color domain into at least one new color domain, a plurality of medians are computed, each median being associated with a block region, each median being associated with a given block region in the block regions, each median being function of a median of coefficients associated with coordinate values in the given block region and with a coordinate value in the at least one new color domain of the subband.

9. A non-transitory computer readable storage medium for determining noise levels in a subband of an image, having stored thereon a computer program comprising program instructions, the subband comprising at least one color domain and at least two space domains, said subband comprising first wavelet coefficients associated with coordinate value in the at least one color domain and with coordinate values in the at least two space domains, the computer program being loadable into a data-processing unit and adapted to cause the data-processing unit to carry out the steps, when the computer program is run by the data-processing device:
   receiving the subband of the image;
   defining block regions in the at least two space domains of the subband;
   for each defined block region:
   identifying first wavelet coefficients with coordinate values in the at least two space domains in the defined block region;
   computing a correlation matrix between identified wavelet coefficients to determine the correlation between first wavelet coefficients according to the at least one color domain;

computing second wavelet coefficients, the computation of second wavelet coefficients being based on the correlation matrix and the first wavelet coefficients;

computing at least one noise level, the noise level computation being based on at least one second wavelet coefficient; and providing the at least one noise level.

10. A device for determining noise levels in a subband of an image, the subband comprising at least one color domain and at least two space domains, the subband comprising first wavelet coefficients associated with coordinate values in the at least one color domain and the at least two space domains, wherein the device comprises:

an input interface for receiving the subband of the image;

a circuit for defining block regions in the at least two space domains of the subband;

a circuit for identifying first wavelet coefficients associated with coordinate values in the at least two space domains in the identified block;

a circuit for computing a correlation matrix between identified wavelet coefficients to determine the correlation between first wavelet coefficients according to the at least one color domain;

a circuit for computing second wavelet coefficients, the computation of second wavelet coefficients being based on the correlation matrix and the first wavelet coefficients;

a circuit for computing at least one noise level, the noise level computation being based on at least one second wavelet coefficients; and an output interface for providing the at least one noise level.

* * * * *